| United States Patent [19] | [11] | 4,176,203 |
|---|---|---|
| Lagerstrom | [45] | Nov. 27, 1979 |

[54] PROCESS AND AN APPARATUS FOR ALKALI-TREATMENT OF LIGNOCELLULOSIC MATERIAL

[75] Inventor: Gosta B. Lagerstrom, Angelholm, Sweden

[73] Assignee: Boliden Aktiebolag, Sweden

[21] Appl. No.: 772,073

[22] Filed: Feb. 25, 1977

[30] Foreign Application Priority Data

Feb. 27, 1976 [SE] Sweden ................................ 7602799

[51] Int. Cl.² .................................................. A23K 1/12
[52] U.S. Cl. ..................................... 426/636; 426/302; 426/626; 426/807
[58] Field of Search ................ 426/626, 623, 635, 636, 426/506, 807, 302; 162/86, 90, 248; 134/181, 200, 172; 99/516; 239/185; 118/24, 323, 326

[56] References Cited

U.S. PATENT DOCUMENTS

| 2,985,236 | 5/1961 | Ranhagen | 162/248 |
|---|---|---|---|
| 3,171,265 | 3/1965 | Hemery et al. | 134/172 X |
| 3,367,154 | 2/1968 | Wyatt et al. | 134/172 X |
| 3,538,927 | 11/1970 | Wallgren | 134/180 X |
| 3,889,472 | 6/1975 | Guillaud | 118/323 |
| 4,048,341 | 9/1977 | Lagerstrom et al. | 426/636 |

FOREIGN PATENT DOCUMENTS

206996 12/1955 Australia .................................. 426/636

*Primary Examiner*—R. B. Penland
*Attorney, Agent, or Firm*—Gordon W. Hueschen

[57] ABSTRACT

The invention relates to a process for increasing the feed value of lignocellulosic materials by contacting the material with an alkaline liquid. The alkaline liquid is applied on top of a mass of lignocellulosic material within a limited zone, said zone being moved across the whole upper surface of said mass. The invention also provides for an apparatus suitable for carrying out such process.

6 Claims, 3 Drawing Figures

PROCESS AND AN APPARATUS FOR ALKALI-TREATMENT OF LIGNOCELLULOSIC MATERIAL

The present invention relates to a process and to an apparatus for alkali-treatment of lignocellulosic materials, such as straw, by treatment with a solution of a base and subsequent neutralization with an acid.

By straw is usually meant the straws remaining after threshing of mature crop. The straw can be used as a fodder for ruminants but its feed value is low in view of a rather far-reaching lignification, i.e. the cellulose has been enclosed in lignine. The lignine incapsules the cellulose and prevents the cellulose-decomposing enzymes from the microorganisms of the rumen from acting. In this form the main value of the straw lies in the fact that it imparts to the fodder mass a structure suitable for the ruminants thereby promoting normal rumen activity, which in turn effects the fodder conversion ability and thereby also the economy of production.

In the table below an analysis for some different types of straw is given.

| Type of plant | Ash contents % | Lignine % | Cellulose % | Pentosanes % |
|---|---|---|---|---|
| Straw of barley | 4 | 14 | 35 | 28 |
| Straw of oat | 5 | 15 | 37 | 29 |
| Straw of wheat | 3 | 17 | 39 | 29 |
| Straw of rye | 4 | 18 | 40 | 27 |

Only a fraction of the above nutritives can be utilized by the cattle. This has for a result that the straw has only delimited possible uses. Primarily growing and low-producing ruminants are given straw, since the straw can cover part of the requirements for maintaining such animals, whereas its contents of nutritives are insufficient for the product. Today straw is therefore mostly considered as a waste and it is common practice that it is burnt in the fields or ploughed down into the soil. Burning is deplorable not only from the point of view that enormous feed values are wasted but also in view of the fact that the heavy smoke generation is inconvenient from an environmental point of view and also because a considerable fire hazard is present in the surroundings. Thus, it is highly desirable to recover this fodder reserve found in enormous quantities in the whole world.

In order to expose the cellulose one has to break down or at least create openings in the lignine so that the cellulose-decomposing enzymes from the microorganisms of the rumen will have a possibility of effecting the cellulose. It is known that loosening can be obtained by treatment with different chemicals, such as sodium hydroxide, ammonia, sodium sulphide etc. Mostly sodium hydroxide is used, since it is relatively cheap and also highly effective. Hereby the high-value fodder cellulose can be exposed, which makes the treated straw well suited for part of the total fodder for high-producing ruminants, i.e. animals subject to high requirements with regard to production capacity. Factors of importance for the result of an alkali-treatment of straw are primarily concentration of alkali, pressure, temperature and reaction time.

Methods of treating straw with alkali were known already at the beginning of the 20th century, and different systems have been tested with varying success. Common to processes known up to now is the fact that they are all subject to disadvantages in the form of the formation of waste solutions which are difficult to handle, and due to the fact that great amounts of alkaline and acid solutions will have to be handled for providing effective treatment.

In the following the invention will be described primarily with reference to straw, but it should be noted that the invention in no way is delimited to this but relates to the treatment of all types of lignocellulosic materials.

The invention is based upon the surprising discovery that if a mass of lignocellulosic material, for example straw, is sprinkled from above with an alkaline liquid within a delimited zone which is moved across the whole upper surface of the mass the alkali treatment becomes much more effective than if the sprinkling takes place simultaneously over the whole surface. Thus, one could expect that sprinkling of the mass over the whole upper surface for a certain period of time and with a certain amount of alkaline liquid per unit of time would result largely in the same effect of treatment as sprinkling the mass in accordance with the technique of this invention using the same total sprinkling time and the same total amount of liquid supplied. However, this is not the case and no definite explanation to the effect has yet been found.

The alkaline liquid or basic solution is suitably sprinkled in the form of a curtain extending across the mass and being moved along the mass from one end thereof to the other end thereof at least once. The basic solution is preferably sprinkled and drained from the mass in a recirculating cycle. With regard to details concerning the course of the alkaline treatment reference is had to our U.S. patent application Ser. No. 593,662, U.S. Pat. No. 4,048,341.

In the subsequent neutralization with the acid solution there is obtained a residual solution which may create certain problems in that, if allowed to stand, it turns sour thereby being unsuited for use in a new batch of acid solution. In accordance with this invention it has been found that if the residual solution resulting from the acid neutralization is part in the basic solution used for the treatment of a new quantity of lignocellulosic material, this inconvenience will be eliminated in a highly simple and efficient manner.

The basic solution used for the alkali-treatment is suitably prepared starting from a suitable quantity of water, a concentrated basic solution being added at a rate essentially corresponding to the absorption of basic material in the mass of lignocellulosic material so as to keep the basicity of the basic solution at a low level. This procedure can be applied also with regard to the acid neutralization by circulating the residual solution from the preceding treatment with basic solution and supplying an acid solution synchronously with the neutralization of the mass, whereby the pH of the circulating solution decreases relatively slowly, preferably not below about 7. This is, of course, of importance with regard to diminishing the corrosion of the apparatus used.

The invention also provides for an apparatus for carrying out the process as outlined above, and said apparatus includes means for supporting the mass of lignocellulosic material, a collecting means positioned under said support means for solutions drained from the mass, and means for sprinkling said solutions onto the mass of lignocellulosic material. The apparatus is characterized by distributing means for sprinkling the solutions within a delimited zone of the mass of lignocellulosic material, said distributing means being movable across the whole upper surface of the mass. The distributing means suitably consists of a device extending across the mass of lignocellulosic material and being movable from one end of the mass to its other end, said movement being repeatable any number of times. The apparatus is further suitably provided with means for controlled supply of basic solution and acid solution to said collecting means.

The invention will in the following be described by non-limiting examples in connection to the appended drawings, wherein.

Figure 1:
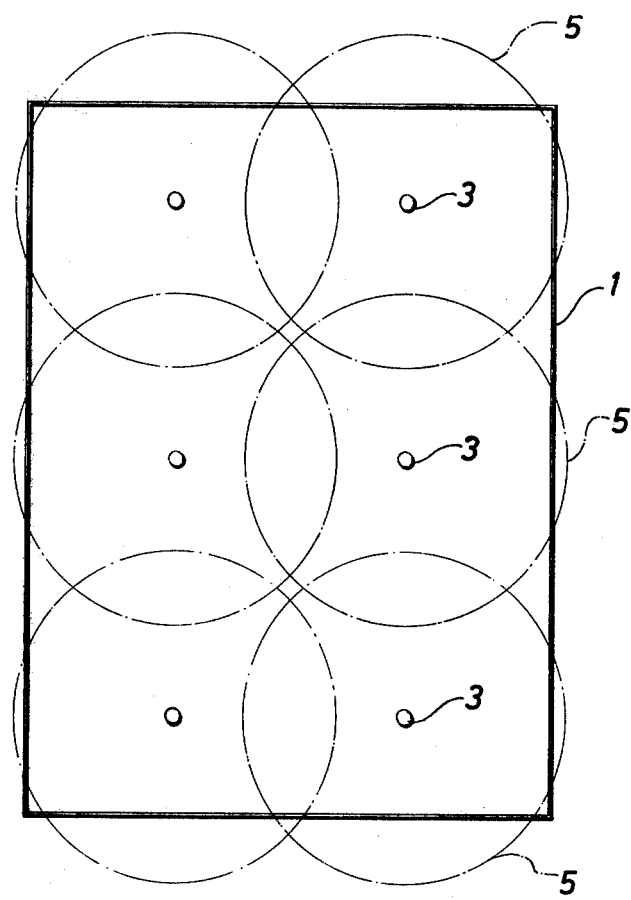
FIG. 1 shows diagrammatically and seen from above an apparatus for simultaneously sprinkling of a mass of straw from above over the whole upper surface thereof.

According to FIG. 1 there are used for sprinkling straw, for example in the form of bales of straw, six spray nozzles 3 arranged above a container 1 intended to contain bales of straw. The effective sprinkling surface for each spray nozzle 3 lies within circles 5 indicated in FIG. 1. As is seen from FIG. 1 for essentially complete coverage of the upper surface of the mass of straw significant overlap of the circles 5 is required. This means that the part of the solution coming into contact with the side walls of the container most probably flows along the walls of the container thereby not effectively participating in the treatment of the straw.

Figure 2:
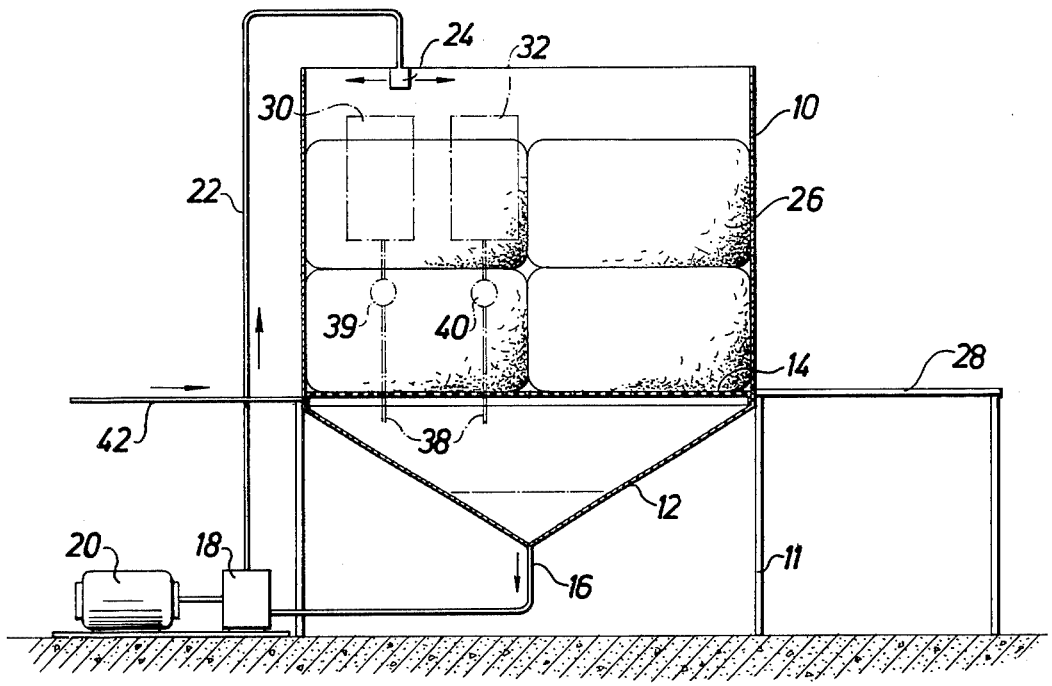
FIG. 2 shows in a diagrammatic side view an embodiment of the apparatus according to this invention.
Figure 3:
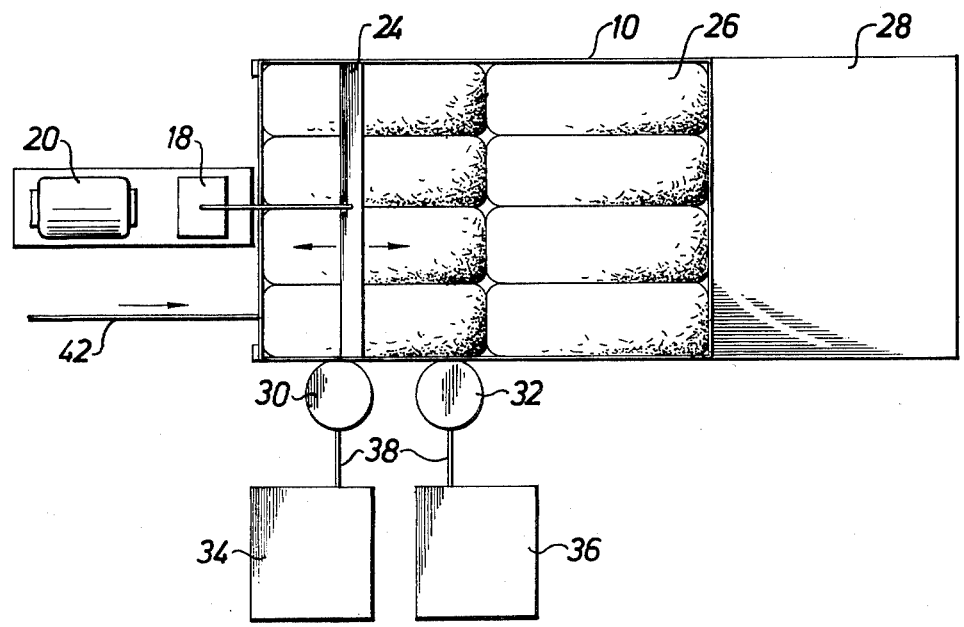
FIG. 3 shows the embodiment of FIG. 2 seen from above.

The embodiment shown in FIGS. 2 and 3 of the drawings is designed in accordance with this invention. The apparatus consists of a container 10 provided with a lower tapered collecting part 12 and supported by a stand 11. Container 10 is provided with a horizontally positioned interior grid 14 adapted to serve as a support for straw bales 26 placed in the container. The conical collecting part 12 is provided with a discharge conduit 16 at the lower end connected to the inlet of a pump 18 driven by a motor 20. The outlet of pump 18 is via a recirculating conduit 22 connected to a distributing member 24 distributing the circulating solution over the whole width of container 10. The distributing member 24 is, as indicated with arrows, movable along the whole length of container 10 in a manner not further illustrated in the figures. The distributing member is arranged to supply a basic solution and an acid solution in the form of a curtain, as indicated in FIG. 2, extending across container 10.

As seen to the right in FIGS. 2 and 3, container 10 is provided with a removable wall, whereby the straw bales 26 can be transferred into the container 10 and withdrawn therefrom after concluded treatment via a platform 28.

In adjunction with container 10 there are provided metering containers 30 and 32 for basic solution and acid solution, respectively, and each of said metering containers is connected to a main container 34 and 36, respectively, by conduits 38. From the metering containers the conical part 12 of the straw container can be supplied with basic solution and acid solution, respectively, at the desired rate by adjustment of valves 39 and 40, respectively. The container can be supplied with water in the desired quantity through a supply conduit 42. The operation of the apparatus described above is briefly the following.

Across platform 28 and the openable wall of container 10 the straw bales are transferred onto grid 14, the number of bales being 16 in the example described. Thereafter water is added to the conical collecting part 12 through conduit 42 to a suitable volume. The sodium hydroxide solution is then transferred to the collecting part 12 from the metering vessel 30 under circulation of the alkaline solution formed, the distributing member 24 being reciprocated across the straw bales.

After terminated circulation of alkaline solution and a suitable retention time, for example 16–20 hours, to provide for a good treating effect, the circulation is again started and is maintained under the desired period of time while supplying an adjusted amount of acid solution from metering container 32. After drainage of the neutralization solution the straw bales are withdrawn from container 10 for use. The residual solution from the acid neutralization is now suitably admixed with a new charge of alkaline solution to avoid the souring mentioned above, the procedure described above being repeated. In continuous operation the alkaline solution in the form of a concentrate can be supplied at a rate corresponding to the alkali up-take in the manner indicated above.

EXAMPLE 1

The degree of soakage of hard-pressed straw bales with an aqueous solution of sodium hydroxide was measured in two experiments, of which in one experiment there was used the conventional technique of total simultaneous sprinkling, whereas in the second experiment the technique according to this invention was used. In both experiments four straw bales having a weight of about 10 kg each and the approximate measures $35 \times 40 \times 100$ cm were positioned in an open parallelepiped container having a horizontal grid and therebelow a conically tapered collecting part with a bottom outlet. By means of a circulation conduit solutions could be transferred from the bottom outlet to a distributing device positioned above the parallelepiped container. The measures of the grid were $80 \times 110$ cm and the distance from the grid to the upper rim of the container was 130 cm. Straw bales were arranged in two layers with two bales in each layer having essentially vertical straw orientation. With this arrangement the straw covered practically the whole surface of the grid.

In the first experiment the alkaline solution was distributed by means of six spray nozzles 3 positioned as shown in FIG. 1. The nozzles were of the so-called full cone type giving an even distribution of solution within a circular area. The amount of solution flowing along the walls of the container was estimated to be 15–20% of the total flow, for which compensation was made in comparison with the two other experiments, as is clear from the experimental results below.

In the other experiment the alkaline solution was supplied by using a distributor giving a fan-shaped distribution of the solution. The distributor was attached to a carriage, which, by means of a motor of a variable rotational speed, could be moved at an even and desired velocity back and forth across the straw, so that every section of the uppermost layer was sprinkled and only a negligible amount of solution flowed onto the inside of the walls of the container. This procedure is in accordance with the sprinkling principle as shown in FIGS. 2 and 3. The velocity of the distributor was 1.26 m/min.

linearly and each passage of 105 cm lasted for a period of time of about 50 seconds.

The following table gives the experimental conditions and the results of the experiments.

|  | Experiment 1 | Experiment 2 |
|---|---|---|
| Weight of straw, kg | 40.9 | 39.9 |
| Moisture content, % | 9.2 | 9.7 |
| Circulating flow, l/min. | 98 | 83 |
| Circulation time, hours | 2 | 2 |
| Quantity of solution at start, liters | 230 | 230 |
| NaOH-concentration in starting solution, g/l | 12 | 12 |
| Quantity of residual solution after circulation and drainage for 1 hour, liter | 146 | 130 |
| NaOH-concentration in residual solution, g/l | 6.5 | 4.3 |
| Solution temperature at start, °C. | 30 | 30 |
| Quantity of absorbed solution per kg of straw, liter | 2.05 | 2.51 |
| Quantity of dry straw after sprinkling, kg |  |  |
| In the two upper bales | 0.2 | 0 |
| In the two lower bales | 3.4 | 0.2 |

From the above experimental results and experimental conditions it is clear, firstly, that the circulating flow under experiment 1 has been adjusted to compensate for flow of solution along the walls of the container (98 l/min. as opposed to 83 l/min. in experiment 2). Secondly, it is directly clear that the absorption efficiency is considerably higher in experiment 2 in accordance with the invention, which is clear also from the measured quantity of dry straw after sprinkling with alkaline solution. Sprinkling within a delimited movable zone in accordance with this invention thus results in a more efficient treatment in spite of the fact that the period of treatment and the amount of circulated solution is the same in the two experiments.

EXAMPLE 2

The present example relates to four experiments carried out in accordance with this invention using varying speed with regard to the distributing member. In other respects the conditions were the same as under experiment 2 of example 1. Otherwise the conditions and the experimental results obtained are given in the table below.

|  | Experiment No. | | | |
|---|---|---|---|---|
|  | 1 | 2 | 3 | 4 |
| Weight of straw, kg | 38.1 | 39.9 | 41.0 | 39.8 |
| Moisture content, % | 9.2 | 9.7 | 10.1 | 9.2 |
| Velocity of distributor, m/min. | 0.63 | 1.26 | 2.61 | 5.20 |
| Quantity of residual solution after circulation and drainage for 1 hour, l | 124 | 130 | 139 | 145 |
| Absorbed quantity of solution l/kg straw | 2.78 | 2.51 | 2.22 | 2.14 |

As is clear from the above experimental results, faster movement of the distributing member results in a gradually impaired absorption, which is explainable since the limit case using indefinitely large velocity corresponds to simultaneous total sprinkling in accordance with the apparatus according to FIG. 1. In other respects the example illustrates clearly the improvement of the treatment efficiency obtained by using the technique of this invention.

It is to be understood that the invention is applicable to all kinds of straw from lignified stalks of cereal types of grass, for instance rye, barley, wheat, oats etc. These stalks are generally obtained as straw upon threshing or grinding for separating the grains. It should be understood that all such materials are included in the expression "straw" as used in this disclosure.

What is claimed is:

1. A process for increasing the feed value of lignocellulosic materials by treatment with a solution of a base and subsequent neutralization with an acid, comprising applying the alkaline solution on top of a mass of lignocellulosic material within a limited zone, and travelling said zone across the whole upper surface of said mass, said alkaline solution being applied at a rate essentially corresponding to the rate of uptake of said alkaline solution by the straw, draining and recirculating residual alkaline solution and subsequently neutralizing the alkali treated straw with an acid.

2. In a process for treating baled straw with an aqueous alkaline solution for the purpose of partially breaking down lignin of the straw so as to expose cellulose to cellulose degrading enzymes in the rumen of a ruminant animal, the improvement which comprises:

spraying said aqueous alkaline solution from above on a mass of said straw at a rate essentially corresponding to the uptake of alkali by the straw and in the form of a curtain extending across the mass, said curtain travelling across the whole upper surface of the mass at least once, draining and recirculating residual alkaline solution and subsequently neutralizing the alkali treated straw with an acid.

3. A process according to claim 2, wherein the residual solution remaining after the acid neutralization forms part of the alkaline solution used for alkali-treatment of a new quantity of said straw.

4. A process according to claim 2, wherein the acid is added during the circulation of the residual solution from the alkali-treatment at such a rate that the pH of the resulting solution is slowly lowered to about 7.

5. The process according to claim 2, wherein the curtain of spray is travelled across the whole upper surface at the rate of about 1.26 m/min.

6. The process according to claim 5 wherein the whole upper surface area is about 70×100 cm² and the solution is applied at the rate of about 83 l/min for 2 hours.

* * * * *